United States Patent
Danilov et al.

(10) Patent No.: US 10,614,055 B2
(45) Date of Patent: Apr. 7, 2020

(54) METHOD AND SYSTEM FOR TREE MANAGEMENT OF TREES UNDER MULTI-VERSION CONCURRENCY CONTROL

(71) Applicant: EMC IP Holding Company LLC, Hopkinton, MA (US)

(72) Inventors: Mikhail Danilov, Saint Petersburg (RU); Konstantin Buinov, Leningradskaya (RU); Andrey Kurilov, Kal'tino (RU); Mikhail Malygin, Saint Petersburg (RU); Ivan Tchoub, Saint Petersburg (RU)

(73) Assignee: EMC IP HOLDING CIMPANY LLC, Hopkinton, MA (US)

( * ) Notice: Subject to any disclaimer, the term of this patent is extended or adjusted under 35 U.S.C. 154(b) by 269 days.

(21) Appl. No.: 15/639,589

(22) Filed: Jun. 30, 2017

(65) Prior Publication Data
US 2018/0189342 A1    Jul. 5, 2018

(30) Foreign Application Priority Data
Dec. 29, 2016 (RU) .................... 2016152148

(51) Int. Cl.
  *G06F 16/23* (2019.01)
  *G06F 16/22* (2019.01)
  *G06F 16/901* (2019.01)

(52) U.S. Cl.
  CPC ...... *G06F 16/2329* (2019.01); *G06F 16/2246* (2019.01); *G06F 16/2255* (2019.01); *G06F 16/9027* (2019.01)

(58) Field of Classification Search
  None
  See application file for complete search history.

(56) References Cited

U.S. PATENT DOCUMENTS

| | | | |
|---|---|---|---|
| 6,741,983 B1* | 5/2004 | Birdwell | G06F 16/2264 |
| 8,412,810 B1* | 4/2013 | Tompkins | G06F 9/45558 |
| | | | 709/201 |
| 2002/0193981 A1* | 12/2002 | Keung | G06K 9/6219 |
| | | | 704/1 |
| 2007/0112755 A1* | 5/2007 | Thompson | G06F 16/355 |

(Continued)

*Primary Examiner* — Wilson Lee
(74) *Attorney, Agent, or Firm* — Womble Bond Dickinson (US) LLP

(57) ABSTRACT

Method for tree management of trees under multi-version concurrency control is described herein. Method starts by detecting change in a size of a cluster. The number of nodes in the cluster is counted to obtain the changed size of the cluster. The number of trees needed for the number of nodes in the cluster is determined. The number of trees may be based on the number of nodes in the cluster and predetermined system balancing coefficient. When the number of trees needed is greater than existing number of trees, existing number of trees is doubled as a single-step operation which includes modifying and scaling hash function used to derive each tree to generate new hash function and using new hash function to partition each tree instantly into two new trees. Scaling happens on demand without service disruption. Hash function scales automatically when number of trees increases. Other embodiments are described.

17 Claims, 6 Drawing Sheets

(56) References Cited

U.S. PATENT DOCUMENTS

| | | | | |
|---|---|---|---|---|
| 2007/0288638 | A1* | 12/2007 | Vuong | H04L 67/104 709/226 |
| 2009/0083390 | A1* | 3/2009 | Abu-Ghazaleh | G06F 15/16 709/209 |
| 2010/0110935 | A1* | 5/2010 | Tamassia | H04L 63/12 370/256 |
| 2012/0185421 | A1* | 7/2012 | Sundaravaradan | G06Q 10/0875 706/45 |
| 2013/0083701 | A1* | 4/2013 | Tomic | H04L 12/462 370/255 |
| 2014/0064393 | A1* | 3/2014 | Sun | H04B 7/0478 375/267 |
| 2015/0261886 | A1* | 9/2015 | Wu | G06F 16/9024 707/798 |
| 2016/0335298 | A1* | 11/2016 | Haggerty | G06F 16/2246 |
| 2017/0099262 | A1* | 4/2017 | Kerschbaum | H04L 9/00 |

* cited by examiner

METHOD AND SYSTEM FOR TREE MANAGEMENT OF TREES UNDER MULTI-VERSION CONCURRENCY CONTROL

CROSS-REFERENCE TO RELATED APPLICATIONS

This application claims priority under 35 U.S.C. § 119 to Russian Patent Application No. 2016152148, filed Dec. 29, 2016, which is incorporated herein by reference in its entirety.

FIELD OF THE INVENTION

Embodiments of the present invention relate generally to data storage systems. More particularly, embodiments of the invention relate to managing the trees under multi-version concurrency control to ensure scalability of the system.

BACKGROUND

In modern computer systems, a file system stores and organizes computer files to enable a program to efficiently locate and access requested files. File systems can utilize a storage device such as a hard disk drive to provide local access to data.

Some modern computer systems use B+ tree data structures that are search tree implementations. The trees maintained are large and major part of each tree is stored on the hard disk drives. Cluster nodes using multi-version concurrency control (MVCC) policy may share the trees. In the current systems, the number of trees is fixed, which causes scalability issues.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

To address the current system's scalability issues, in some embodiments of the invention, a new tree management approach (e.g., Search Forest) is implemented to increase the number of trees in the system depending on the number of nodes in the cluster that is associated with the trees. For instance, the number of trees may increase as the cluster grows. In this embodiment, the new tree management approach works efficiently for small systems, for growing systems and for very large systems.

Figure 1:
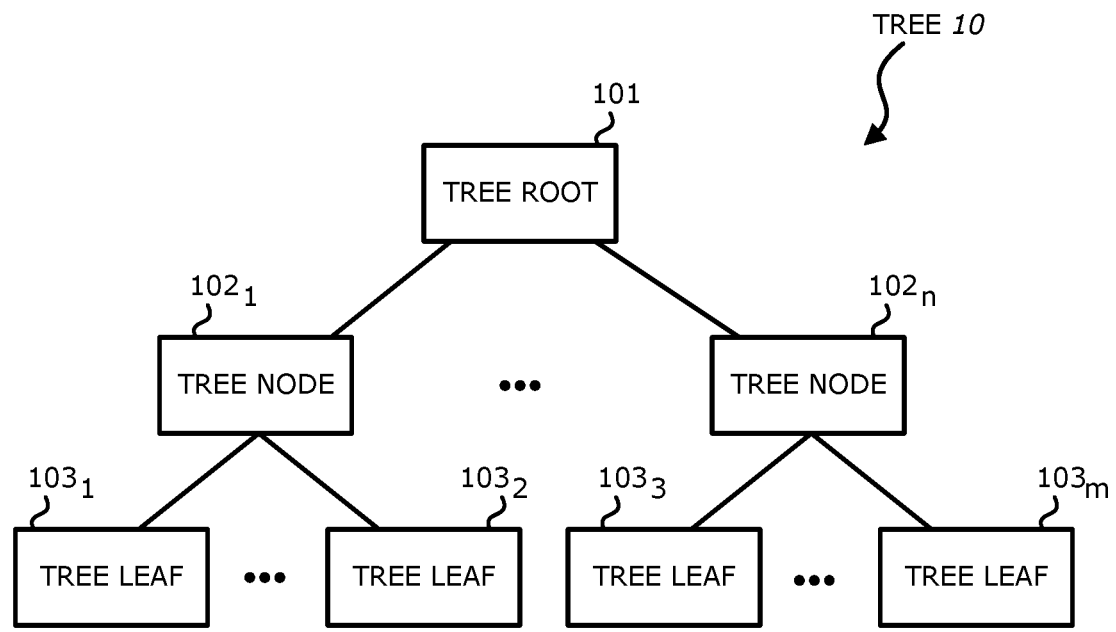
FIG. 1 is a block diagram illustrating an example of one of the trees being processed by one embodiment of the invention.

FIG. 1 is a block diagram illustrating an example of one of the trees being processed by one embodiment of the invention. The tree 10 is a search tree that includes a tree root 101, a plurality of tree nodes $102_1$-$102_n$ (n>1), and a plurality of tree leaves $103_1$-$103_m$ (m>1). In one embodiment, each of the tree nodes $102_1$-$102_n$ include keys and each of the tree leaves $103_1$-$103_m$ include key-value pairs. One example of the tree 10 is the B+ tree data structure. In some embodiments, a single cluster manages thousands the trees 10 because there are multiple system components that use trees to keep or store their information, and there are 128 trees used for each information type in order to keep each particular tree at a reasonable size. While the tree 10 may be large, a major part of each tree 10 resides on hard drives. All the tree elements (e.g., tree root 101, tree nodes $102_1$-$102_n$, and tree leaves $103_1$-$103_m$) are immutable. Therefore, trees 10 are under Multi-Version Concurrency Control policy (MVCC). Each tree 10 update means reallocation of at least N pages (N>0), where N is the current depth of the tree 10. In particular, tree root 101 changes after each update.

A single tree update is an expensive operation in terms of the resources needed and disk and network traffic that it produces. Accordingly, trees are not updated for a single data update. Instead, each tree 10 has a journal of data updates. When a journal becomes full, the journal processor starts which implements a bulk tree update in order to minimize the total cost of the update. Tree updates de facto results in creation of a new tree since the tree root 101 always changes. The old and new trees may share elements therein. Every data lookup in a tree 10 starts from the corresponding journal. Lookup in the tree 10 is performed if needed. In order to speed up data lookup, a large in-memory (e.g., volatile memory) view of each tree 10 may be maintained.

Figure 2:
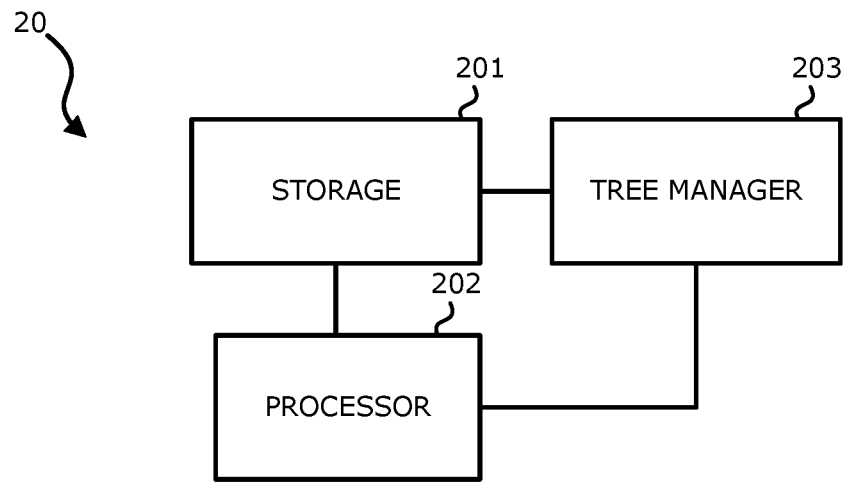
FIG. 2 is a system for tree management of trees under multi-version concurrency control according to one embodiment of the invention.

FIG. 2 is a system for tree management of trees under multi-version concurrency control according to one embodiment of the invention. System 20 implements a tree management approach that is applicable for small systems, growing systems and for very large systems.

As shown in FIG. 2, the system 20 includes storage 201, a processor 202, and a tree manager 203. The processor 202 may include multiple processors or a multicore processor, which may permit parallel processing of information. The storage 201 may include a system memory that is coupled to the processor 202 and may have stored therein instructions that may be executed by the processor 202, to cause the processor 202 to control the elements of the system 20 including the storage 201 and the tree manager 203. The system memory may also have stored therein instructions, which when executed by the processor 202, causes the processor 202 to run an operating system for the system 20. The system memory may include a machine (e.g., a computer) readable storage medium (e.g., read only memory ("ROM"), random access memory ("RAM"), magnetic disk storage media, optical storage media, flash memory devices). The storage 201 may also store content of a plurality of trees 10 in a system 20. Each tree 10 may be associated with a cluster node. Each cluster may include a plurality of cluster nodes. In one embodiment, the storage 201 is a hyperscale shared nothing storage.

Note that, some or all of the components as shown in FIG. 2 may be implemented as processing logic in software, hardware, or a combination thereof. For instance, the system memory may have stored therein instructions, which when executed by the processor 201 causes the processor to perform tree management of trees under multi-version concurrency control as described herein.

In one embodiment, when the processor 202 executes instructions stored in the storage 201, the processor 202 may signal to the tree manager 203 perform the tree management of trees included in the system 20. In this embodiment, in response to the signal or control of the processor 202, the tree manager 203 detects a change in a size of a cluster and counting a number of nodes in the cluster to obtain the changed size of the cluster. The tree manager 203 then determines a number of trees needed for the number of nodes in the cluster. In one embodiment, the number of trees (t) needed for a cluster is calculated using the following equation:

$$t = x * 2^{\lceil \sqrt{n} \rceil}$$

In this equation, t is the number of trees, x is the predetermined system balancing coefficient and n is the number of nodes in the cluster. Accordingly, in this embodiment, the number of trees is based on the number of nodes in the cluster and predetermined system balancing coefficient. Thus, as the system grows (i.e., more cluster nodes are added to the cluster), the number of trees 10 grows as well. Specifically, using this equation, when the cluster grows, the base part of the equation ($2^{\lceil \sqrt{n} \rceil}$) ensures that the number of trees 10 multiplied by a number that is a power of 2 (i.e., multiplied by 2 (i.e., doubles), multiplied by 4 (i.e., quadruples), etc.). Accordingly, for a classic cluster configuration where the number of nodes is a power of two, the base part of the equation gives the number of nodes (e.g., it is 4 for 4 nodes and 256 for 256 nodes). For non-classic configurations the base part of the formula gives a power of two that is greater than the number of nodes (e.g., it is 8 for 6 nodes and 256 for 212 nodes).

In the system 20, each particular tree 10 at any given point in time is owned by one and only one of the cluster nodes and only a node that owns a tree 10 can modify it. The tree manager 203 performs load balancing to ensure that cluster nodes own more or less equal number of trees 10. Accordingly, tree ownership can migrate from one cluster node to another. This usually happens when a cluster changes its state (i.e. one or several nodes attach or detach a storage cluster). When a cluster node goes down, shuts down, stops or detaches from the cluster (e.g., due to software or hardware failure or during upgrade), other cluster nodes must pick up or take ownership of the orphaned trees (i.e., trees that previously were owned by this cluster node).

Figure 3A:
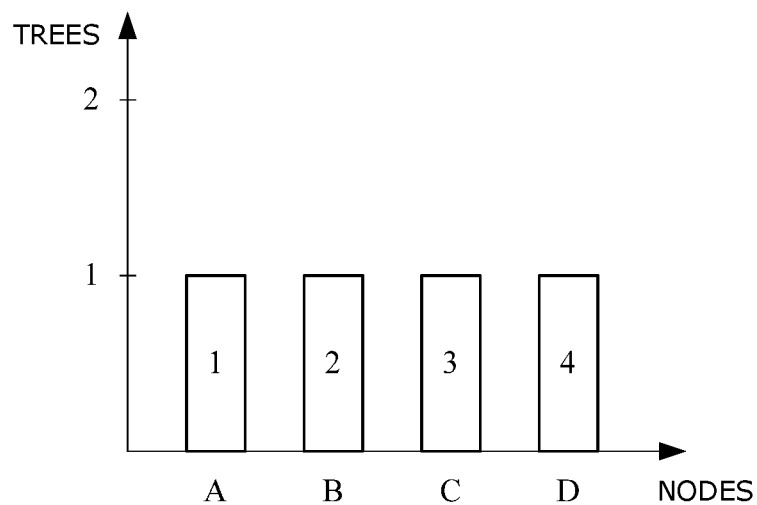
FIGS. 3A-3B are graphs depicting load balancing where (i) there is a healthy cluster without a balancing coefficient (FIG. 3A) and (ii) a cluster without a balancing coefficient and where one node fails (FIG. 3B) according to one embodiment of the invention.
Figure 3B:
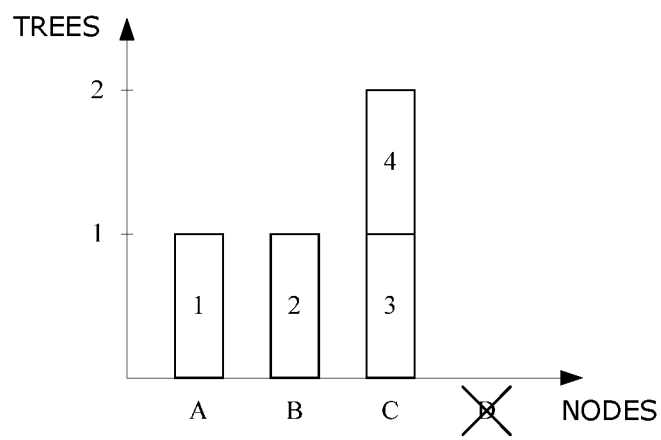

In light of this load balancing, FIGS. 3A-3B and FIGS. 4A-4B illustrate the benefits of including the balancing coefficient x in the determination of the number of trees (t) needed for a cluster. In FIG. 3A, the graph depicts load balancing where there is a healthy cluster without a balancing coefficient according to one embodiment. The cluster in FIG. 3A includes four cluster nodes A, B, C, and D. Each node owns one tree. The trees 10 are labeled in FIGS. 3A-3B as numbers 1, 2, 3, and 4. FIG. 3B is a graph that depicts a cluster without a balancing coefficient and where one node fails according to one embodiment. As shown in FIG. 3B, the cluster node D fails and one of the remaining cluster nodes (i.e., node C) picks up the orphaned tree 4 and is then the owner of two trees: trees 3 and 4. The quality of the balancing is determined using the ration minimum load/maximum load and the load is measured as the number of trees owned by a given cluster node. The higher the ratio value, the higher the quality of the balancing. In FIG. 3B, the ratio that describes the quality of the balancing has a value of 1/2.

Figure 4A:
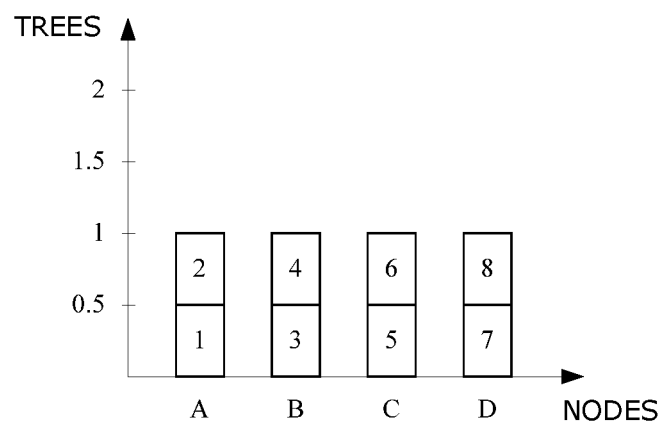
FIGS. 4A-4B are graphs depicting load balancing where (i) there is a healthy cluster with a balancing coefficient (FIG. 4A) and (ii) a cluster with a balancing coefficient and where one node fails (FIG. 4B) according to one embodiment of the invention.
Figure 4B:
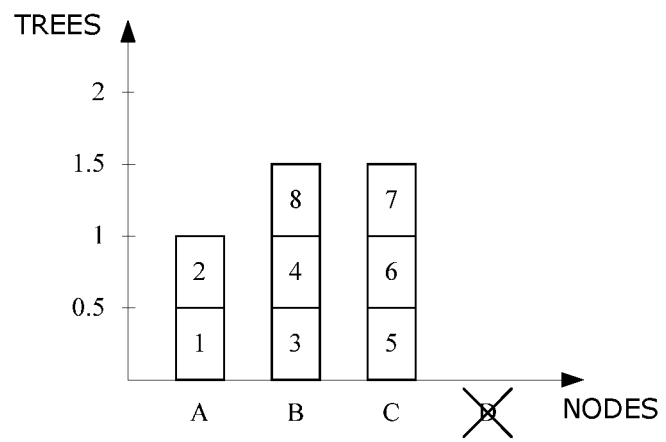

FIG. 4A is a graph depicting load balancing where there is a healthy cluster with a balancing coefficient and FIG. 4B is a graph depicting load balancing where there is a cluster with a balancing coefficient and where one node fails according to one embodiment of the invention. In the example in FIGS. 4A-4B, the value of the balancing coefficient x is 2. As shown in FIG. 4A, the cluster includes four cluster nodes A, B, C, and D. Each cluster node owns two trees. For example, cluster node A owns the pair of trees 1 and 2, cluster node B owns the pair of trees 3 and 4, cluster node C owns the pair of trees 5 and 6, and cluster node D owns the pair of trees 7 and 8. In FIG. 4B, a load change is shown after the cluster node D fails. Specifically, two of the remaining cluster nodes (e.g., cluster nodes B and C) picked up the orphaned trees 7 and 8 and became their owners. The ratio that describes the quality of balancing has a value of 2/3. Thus, in this example, the use of the balancing coefficient increased the quality of the load balancing from 1/2 (in FIG. 3B) to 2/3 (in FIG. 4B). While the greater the value of the balancing coefficient, the higher quality of balancing, the greater value of the balancing coefficient also results in the greater the number of trees to manage based on the equation:

$$t = x * 2^{\lceil \sqrt{n} \rceil}$$

Accordingly, using the equation to compute the number of trees needed in the system 20, the tree manager 203 then determining whether the number of trees needed (t) is greater than an existing number of trees. In one embodiment, the tree manager 203 increases the number of trees by doubling the existing number of trees as a single-step operation to obtain the number of trees needed when the number of trees needed is greater than the existing number of trees. Since a multiplication by a number that is a power of 2 may be implemented as a sequence of multiplications by two, the tree manager may replicate the doubling of the trees as described herein to achieve the multiplication by a number that is a power of 2 that is needed to obtain any number of trees (t).

Figure 5A:
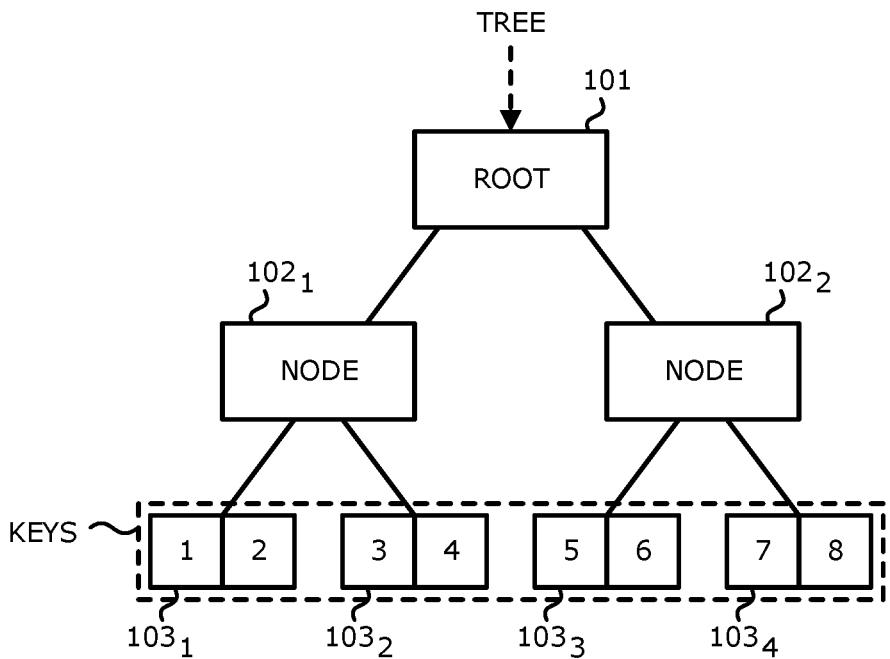
FIGS. 5A-5C are block diagrams illustrating an example of (i) a tree before being split into two new trees (FIG. 5A), (ii) the two new trees obtained after the split (FIG. 5B) and (iii) the two new trees after garbage collection (FIG. 5C) according to one embodiment of the invention.
Figure 5B:
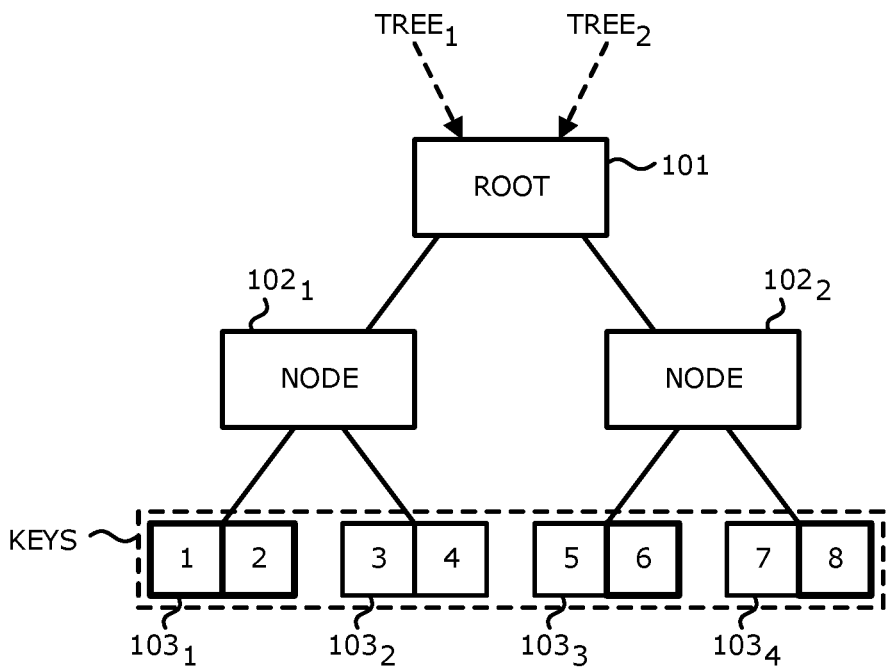

In this embodiment, in order to double the existing number of trees as a single-step operation to obtain the number of trees needed, the tree manager 203 modifies and scales a hash function used to derive each one of the trees to generate a new hash function and uses the new hash function to partition each of one of the trees instantly into two new trees (e.g., $Tree_1$, $Tree_2$). The two new trees include a first new tree and a second new tree. In FIGS. 5A-5B, block diagrams illustrating an example of (i) a tree before being split into two new trees (FIG. 5A), and (ii) the two new trees obtained after the split (FIG. 5B) are illustrated according to one embodiment of the invention.

As shown in FIGS. 5A-5B, instant split of the tree in FIG. 5A is possible because the trees 10 are under MVCC. The idea is to start using the single tree in FIG. 5A as two new trees. The logical separation of the two new trees is assured by the new hash function. In FIG. 5A, the single tree 10 before the split includes a root 101, two internal or tree nodes $102_1$, $102_2$, and four tree leaves $103_1$-$103_4$. Each tree leaf $103_1$-$103_4$ includes a pair of keys (e.g., key pairs [1, 2], [3, 4], [5, 6], [7, 8]). After the logical split in FIG. 5B, de facto both new trees (e.g., $Tree_1$, $Tree_2$) share the root 101. The new hash function partitions the single (original) tree 10. For example, as shown in FIG. 5B, according to this new hash function, the keys 1, 2, 6 and 8 belong to the first tree (i.e., $Tree_1$) and the keys 3, 4, 5, and 7 belong to the second tree (i.e., $Tree_2$). Accordingly, the keys 3, 4, 5, and 7 are garbage to the first tree (i.e., $Tree_1$) and the keys 1, 2, 6, and 8 are garbage to the second tree (i.e., $Tree_2$).

Figure 5C:
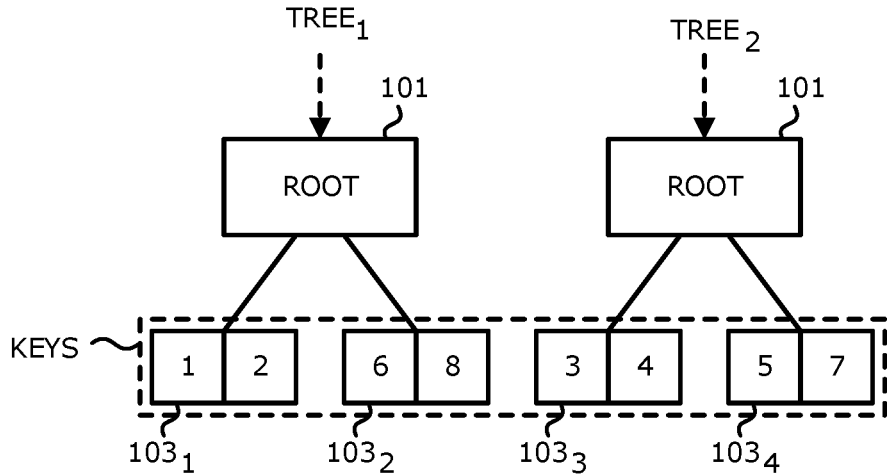

In one embodiment, the tree manager 203 may perform a garbage collection of keys included in the two new trees (e.g., $Tree_1$, $Tree_2$). In this embodiment, the tree manager 203 may include a tree scanner that scans each of the two new trees (e.g., $Tree_1$, $Tree_2$) and assesses keys stored in tree leaves (e.g., $103_1$-$103_4$) included in the two new trees (e.g., $Tree_1$, $Tree_2$) to determine whether the keys belong to the first new tree (e.g., $Tree_1$) or to the second new tree (e.g., $Tree_2$). In one embodiment, the new hash function is used to determine whether the keys belong to the first new tree (e.g., $Tree_1$) or to the second new tree (e.g., $Tree_2$). The tree manager 203 (or the tree scanner therein) then deletes the keys belonging to the first new tree (e.g., $Tree_1$) from the second new tree (e.g., $Tree_2$) and deleting the keys belonging to the second new tree (e.g., $Tree_2$) from the first new tree (e.g., $Tree_1$). In one embodiment, all the delete requests are first sent to the tree journals. In this embodiment, during journal processing, the garbage keys are deleted from the two new trees and the two new trees are rebalanced. FIG. 5C is a block diagram illustrating an example the two new trees after garbage collection according to one embodiment of the invention. As shown in FIG. 5C, each of the new trees (e.g., $Tree_1$ and $Tree_2$) has its own root 101 and there are no tree leaves $103_1$-$103_m$ that are shared between the new trees.

In one embodiment, the new hash function may be the following function:

$$i = k \bmod t$$

Figure 6A:
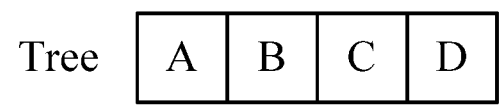
FIGS. 6A-6B are block diagrams of an array of trees before being split into two new trees (FIG. 6A) and an array of the two new trees obtained after the split (FIG. 6B) according to one embodiment of the invention.
Figure 6B:
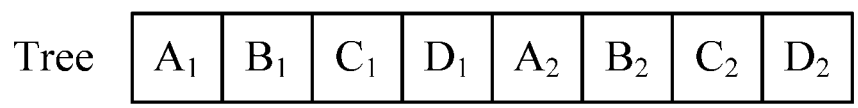

In this function, i is a tree index or home tree index, k is a key value and t is the number of trees. Tree indexing may start from zero. When the number of trees t changes, the hash function changes as well. Accordingly, the array of trees may change after the hash function changes. FIGS. 6A-6B are block diagrams of an array of trees before being split into two new trees (FIG. 6A) and an array of the two new trees obtained after the split (FIG. 6B) according to one embodiment of the invention.

In FIG. 6A, the array of trees includes the four trees A, B, C, and D with the indices 0, 1, 2, and 3 correspondingly. In FIG. 6B, the array of trees after the hash function changes includes eight trees $A_1$, $B_1$, $C_1$, $D_1$, $A_2$, $B_2$, $C_2$, and $D_2$ with the indices 0, 1, 2, 3, 4, 5, 6, and 7, correspondingly. As shown in FIG. 6B, the related trees, e.g. $A_1$ and $A_2$, may not be neighbors in the resulting array of trees. With the array of trees in FIG. 6B, all keys the old hash function mapped to, for instance, the tree A, are mapped by the new hash function to the trees $A_1$ and $A_2$ only.

In the embodiments of the invention, the additional advantage is that scaling may happen on demand without a service disruption. Indeed, (i) the hash function scales automatically when the number of trees t changes and (ii) split of each tree is also instant.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 7:
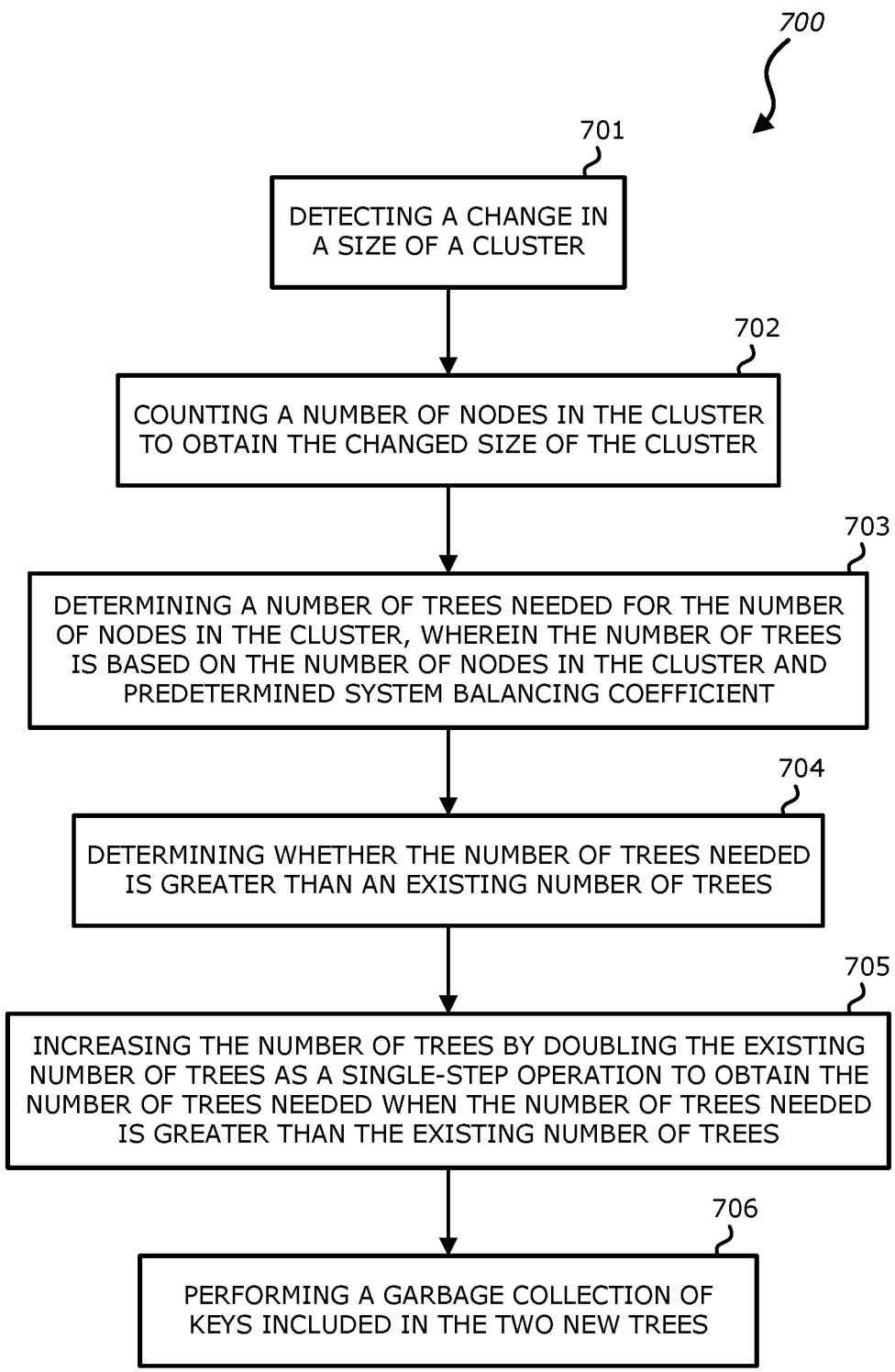
FIG. 7 illustrates an example flow diagram of a process for tree management of trees under multi-version concurrency control according to one embodiment of the invention.

FIG. 7 illustrates an example flow diagram of a process for tree management of trees under multi-version concurrency control according to one embodiment of the invention. The process 700 starts by detecting a change in a size of a cluster at Block 701. At Block 702, a number of nodes in the cluster is counted to obtain the changed size of the cluster and at Block 703, a number of trees needed for the number of nodes in the cluster is determined. In one embodiment, the number of trees is based on the number of nodes in the cluster and the predetermined system balancing coefficient. At Block 704, it is determined whether the number of trees needed is greater than an existing number of trees.

At Block 705, the number of trees is increased by doubling the existing number of trees as a single-step operation to obtain the number of trees needed when the number of trees needed is greater than the existing number of trees. In one embodiment, doubling the existing number of trees as a single-step operation to obtain the number of trees needed includes modifying and scaling a hash function used to derive each one of the trees to generate a new hash function and using the new hash function to partition each of one of the trees instantly into two new trees. At Block 706, a garbage collection a performed of keys included in the two new trees. In one embodiment, performing the garbage collection includes scanning each of the two new trees, assessing keys stored in tree leaves included in the two new trees to determine whether the keys belong to the first new tree or to the second new tree. In one embodiment, the new hash function is used to determine whether the keys belong to the first new tree or to the second new tree. In this embodiment, the keys belonging to the first new tree are deleted from the second new tree and the keys belonging to the second new tree are deleted from the first new tree.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for tree management of trees under multi-version concurrency control comprising:
    detecting a change in a size of a cluster;
    counting a number of nodes in the cluster to obtain the changed size of the cluster;
    determining a number of trees needed for the number of nodes in the cluster, wherein the number of trees is based on the number of nodes in the cluster and predetermined system balancing coefficient
    determining whether the number of trees needed is greater than an existing number of trees; and
    increasing the number of trees by doubling the existing number of trees as a single-step operation to obtain the number of trees needed when the number of trees needed is greater than the existing number of trees.

2. The method in claim 1, wherein the number of trees is determined using a formula:

$$t = x * 2^{\lceil \sqrt{n} \rceil}$$

wherein t is the number of trees, x is the predetermined system balancing coefficient and n is the number of nodes in the cluster.

3. The method of claim 1, wherein doubling the existing number of trees as a single-step operation to obtain the number of trees needed includes:
    modifying and scaling a hash function used to derive each one of the trees to generate a new hash function and using the new hash function to partition each one of the trees instantly into two new trees, wherein the two new trees include a first new tree and a second new tree.

4. The method of claim 3, wherein the scaling happens on demand without a service disruption, wherein the hash function scales automatically when the number of trees increases.

5. The method of claim 4, further comprising performing a garbage collection of keys included in the two new trees, wherein performing the garbage collection includes:
    scanning each of the two new trees;
    assessing keys stored in tree leaves included in the two new trees to determine whether the keys belong to the first new tree or to the second new tree, wherein the new hash function is used to determine whether the keys belong to the first new tree or to the second new tree; and
    deleting the keys belonging to the first new tree from the second new tree and deleting the keys belonging to the second new tree from the first new tree.

6. The method of claim 5, wherein the new hash function is:

$$i = k \bmod t$$

wherein i is a tree index, k is a key value and t is the number of trees.

7. The method of claim 6, wherein the number of trees is increased without a data unavailability window.

8. A computer-readable storage medium having stored thereon instructions, when executed by a processor, causes the processor to perform a method for tree management of trees under multi-version concurrency control comprising:
    detecting a change in a size of a cluster;
    counting a number of nodes in the cluster to obtain the changed size of the cluster;
    determining a number of trees needed for the number of nodes in the cluster, wherein the number of trees is based on the number of nodes in the cluster and predetermined system balancing coefficient;
    determining whether the number of trees needed is greater than an existing number of trees; and
    increasing the number of trees by doubling the existing number of trees as a single-step operation to obtain the number of trees needed when the number of trees needed is greater than the existing number of trees.

9. The computer-readable storage medium in claim 8, wherein the number of trees is determined using a formula:

$$t = x * 2^{\lceil \sqrt{n} \rceil}$$

wherein t is the number of trees, x is the predetermined system balancing coefficient and n is the number of nodes in the cluster.

10. The computer-readable storage medium of claim 8, wherein doubling the existing number of trees as a single-step operation to obtain the number of trees needed includes:

modifying and scaling a hash function used to derive each one of the trees to generate a new hash function and using the new hash function to partition each one of the trees instantly into two new trees, wherein the two new trees include a first new tree and a second new tree.

11. The computer-readable storage medium of claim 10, having stored thereon instructions, when executed by the processor, causes the processor to perform the method further comprising:

performing a garbage collection of keys included in the two new trees, wherein performing the garbage collection includes:

scanning each of the two new trees;

assessing keys stored in tree leaves included in the two new trees to determine whether the keys belong to the first new tree or to the second new tree, wherein the new hash function is used to determine whether the keys belong to the first new tree or to the second new tree; and deleting the keys belonging to the first new tree from the second new tree and deleting the keys belonging to the second new tree from the first new tree.

12. The computer-readable storage medium of claim 11, wherein the new hash function is:

$$i = k \bmod t$$

wherein i is a tree index, k is a key value and t is the number of trees.

13. A system for tree management of trees under multi-version concurrency control comprising:

a storage storing content of a plurality of trees in a system, each tree is associated with a cluster node, wherein a cluster includes a plurality of nodes;

a processor coupled to the storage; and a tree manager coupled to the processor, when the processor executes instructions stored in the storage, the processor signals to the tree manager to:

detect a change in a size of a cluster, count a number of nodes in the cluster to obtain the changed size of the cluster;

determine a number of trees needed for the number of nodes in the cluster, wherein the number of trees is based on the number of nodes in the cluster and predetermined system balancing coefficient;

determine whether the number of trees needed is greater than an existing number of trees; and increase the number of trees by doubling the existing number of trees as a single-step operation to obtain the number of trees needed when the number of trees needed is greater than the existing number of trees.

14. The system in claim 13, wherein the number of trees is determined using a formula:

$$t = x * 2^{\lceil \sqrt{n} \rceil}$$

wherein t is the number of trees, x is the predetermined system balancing coefficient and n is the number of nodes in the cluster.

15. The system of claim 13, wherein doubling the existing number of trees as a single-step operation to obtain the number of trees needed includes:

modifying and scaling a hash function used to derive each one of the trees to generate a new hash function and using the new hash function to partition each one of the trees instantly into two new trees, wherein the two new trees include a first new tree and a second new tree.

16. The system of claim 15, wherein the tree manager further to:

perform a garbage collection of keys included in the two new trees including:

scanning each of the two new trees;

assessing keys stored in tree leaves included in the two new trees to determine whether the keys belong to the first new tree or to the second new tree, wherein the new hash function is used to determine whether the keys belong to the first new tree or to the second new tree; and deleting the keys belonging to the first new tree from the second new tree and deleting the keys belonging to the second new tree from the first new tree.

17. The system of claim 16, wherein the new hash function is:

$$i = k \bmod t$$

wherein i is a tree index, k is a key value and t is the number of trees.

* * * * *